UNITED STATES PATENT OFFICE.

LOUIS JACQUES SIMON AND GEORGES CHAVANNE, OF PARIS, FRANCE.

PROCESS FOR THE MANUFACTURE OF MONOCHLORACETIC ACID.

1,304,108.  Specification of Letters Patent.  Patented May 20, 1919.

No Drawing.  Application filed July 23, 1917.  Serial No. 182,221.

*To all whom it may concern:*

Be it known that we, LOUIS JACQUES SIMON and GEORGES CHAVANNE, of 45 Rue d'Ulm, Paris, France, chemists, have invented a new and useful Improvement in Processes for the Manufacture of Monochloracetic Acid, which improvement is fully set forth in the following specification.

Monochloracetic acid ($CH_2Cl—CO_2H$) is at the present time exclusively prepared by the direct action of chlorin upon acetic acid in the presence of various catalyzing agents.

It is true that it has been proposed in patent literature to make ethyl chloracetate or monochloracetic acid by treating dichlorovinyl ether ($C_2HCl_2—OC_2H_5$) with water or alcohol.

It is also known that dichlorovinyl ether is derived from trichlorethylene by the action of an alkali or of sodium ethylate in alcoholic solution.

By this invention monochloracetic acid is made, without using free chlorin or acetic acid, directly from trichlorethylene or from tetrachlorethane (from which the former can be derived) without its being necessary previously to transform them into dichlorovinyl ether by means of an alkali or sodium alcoholate.

According to this invention monochloracetic acid is made by the direct hydration of trichlorethylene or tetrachlorethane, monochloracetic acid and hydrochloric acid being simultaneously produced.

Hydration is preferably effected by the action of sulfuric acid of suitable strength upon vaporized trichlorethylene.

The concentration of the sulfuric acid and the temperature of the reaction may be varied within somewhat wide limits, and these factors are regulated so as to obtain a maximum yield and the greatest speed of reaction. These depend also on the perfection of contact between the sulfuric acid and the trichlorethylene.

The hydration of trichlorethylene by sulfuric acid may, however, be carried out by dissolving the chlorinated hydrocarbon in sulfuric acid of a concentration of at least 95%, or in oleum, adding a suitable quantity of water and heating to a temperature of between 150° and 200° C.

The sulfuric acid employed in the process may contain substantial quantities of monochloracetic acid without losing its hydrating properties.

The monochloracetic acid remains dissolved in sulfuric acid. It may be separated therefrom by distillation at a suitable pressure. The hydrochloric acid gas evolved is collected in suitable condensing apparatus.

The transformation of trichlorethylene into monochloracetic acid by aid of concentrated sulfuric acid containing water appears to proceed as if the water alone produced the transformation in accordance with the equation—

since the sulfuric acid is found again at the end of the process in a more concentrated condition that at the beginning. While we are unable to fully explain the theory of operation of our process, the following equations are offered as possibly expressing the intermediate reactions taking place:—

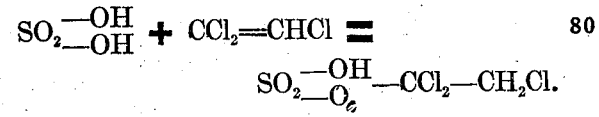

The sulfuric ether thus formed in the presence of water mixed with the sulfuric acid would be hydrolyzed thus:—

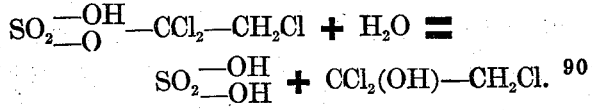

Since an hydroxyl group cannot exist beside a Cl atom when connected to the same C atom, this hydrolyzed product breaks down thus:—

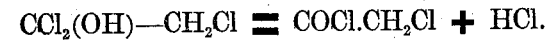

The monochloracetyl-chlorid reacting on another quantity of water mixed with the sulfuric acid produces, in accordance with the general reaction of acid-chlorids, monochloracetic acid—

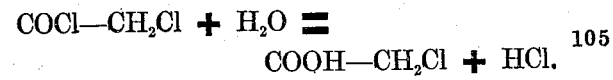

*Example.*

100 parts of trichlorethylene treated with 450 parts of 92% sulfuric acid at a temperature of 160° C. produces:

57 parts of distilled cystalline monochloracetic acid at a minimum and 50 parts of hydrochloric acid gas.

Other methods of separation may advantageously be employed, for example, the monochloracetic acid may be removed by the passage of a current of gas, such as hydrochloric acid gas, or inert vapors; or again, monochloracetic acid may be extracted by ether or other neutral solvent from the sulfuric acid solution previously diluted to a suitable extent with water.

By the addition of an alcohol to the sulfuric acid solution of monochloracetic acid directly obtained in the reaction and subsequently distilling, the corresponding ether is produced, it being unnecessary to isolate the monochloracetic acid. The addition of ethyl alcohol produces ethyl monochloracetate.

Contact between, on the one hand, sulfuric acid and the water it contains (50–66 Bé.) and on the other hand, the vapor of the chlorinated hydrocarbon, is brought about by bubbling, or by pulverizing or by circulation, either in confined spaces or through porous bodies.

It is to be understood where trichlorethylene is mentioned in the claims as the starting material, that tetrachlorethane may be used instead and that, for the purposes of this invention, it is the full equivalent thereof.

Claims.

1. The manufacture of monochloracetic acid by hydrating trichlorethylene by heating it with sulfuric acid containing a small amount of water, substantially as described.

2. The manufacture of monochloracetic acid consisting in heating the vapor of trichlorethylene with sulfuric acid containing a small quantity of water.

3. The manufacture of monochloracetic acid, by dissolving trichlorethylene in sulfuric acid of at least 95%, adding water and heating to a temperature of between 150° and 200° C.

4. The manufacture of monochloracetic acid consisting in subjecting trichlorethylene to the hydrating action of concentrated sulfuric acid containing water in presence of heat, and separating the resulting monochloracetic acid and hydrochloric acid from the sulfuric acid.

5. The manufacture of monochloracetic acid consisting in subjecting 100 parts of trichlorethylene to the action of 450 parts of sulfuric acid of 92% strength at a temperature of about 160° C., and distilling the product to separate the resulting monochloracetic acid and hydrochloric acids.

In testimony whereof we have signed this specification in the presence of two subscribing witnesses.

LOUIS JACQUES SIMON.
GEORGES CHAVANNE.

Witnesses:
GASTON DE MESTRAL,
CHAS. P. PRESSLY.